(12) United States Patent
Ozeki et al.

(10) Patent No.: US 7,486,940 B2
(45) Date of Patent: Feb. 3, 2009

(54) DIGITAL BROADCAST RECEIVING APPARATUS

(75) Inventors: Hiroaki Ozeki, Osaka (JP); Hisaya Kato, Soraku-gun (JP); Sadashi Kageyama, Sanda (JP); Takeo Yasuho, Neyagawa (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 10/528,307

(22) PCT Filed: Mar. 15, 2004

(86) PCT No.: PCT/JP2004/003393

§ 371 (c)(1),
(2), (4) Date: Mar. 17, 2005

(87) PCT Pub. No.: WO2004/084432

PCT Pub. Date: Sep. 30, 2004

(65) Prior Publication Data

US 2006/0018286 A1    Jan. 26, 2006

(30) Foreign Application Priority Data

Mar. 17, 2003    (JP)    ............................. 2003-071400

(51) Int. Cl.
*H04B 1/06* (2006.01)
*H04B 7/00* (2006.01)

(52) U.S. Cl. .............. 455/234.1; 455/245.2; 455/250.1; 455/277.1; 455/277.2

(58) Field of Classification Search ................ 455/272, 455/277.1, 277.2, 232.1, 234.1, 245.1, 245.2, 455/247.1, 250.1
See application file for complete search history.

(56) References Cited

U.S. PATENT DOCUMENTS

| 5,530,926 | A | * | 6/1996 | Rozanski | ................. | 455/277.2 |
| 5,561,673 | A | * | 10/1996 | Takai et al. | ................. | 714/708 |
| 5,648,992 | A | * | 7/1997 | Wright et al. | ................ | 375/347 |
| 5,692,019 | A | * | 11/1997 | Chang et al. | ................ | 375/347 |
| 5,758,271 | A | * | 5/1998 | Rich et al. | ................ | 455/234.1 |
| 5,870,666 | A | * | 2/1999 | Tanaka et al. | ............. | 455/67.11 |
| 6,002,672 | A | * | 12/1999 | Todd | ........................... | 370/252 |
| 6,009,124 | A | * | 12/1999 | Smith et al. | ................. | 375/267 |
| 6,118,773 | A | * | 9/2000 | Todd | ........................... | 370/334 |
| 6,195,535 | B1 | * | 2/2001 | Kurchuk | ....................... | 455/83 |
| 6,335,923 | B2 | * | 1/2002 | Kubo et al. | ................. | 370/335 |
| 6,965,655 | B1 | * | 11/2005 | Mostov et al. | .............. | 375/345 |
| 7,209,724 | B2 | * | 4/2007 | Richards et al. | ............. | 455/266 |
| 7,251,503 | B2 | * | 7/2007 | Shirakata et al. | ......... | 455/562.1 |

(Continued)

FOREIGN PATENT DOCUMENTS

JP    51-85603    7/1976

(Continued)

OTHER PUBLICATIONS

International Search Report corresponding to application No. PCT/JP2004/003393 dated Jun. 22, 2004.

*Primary Examiner*—Duc M Nguyen
(74) *Attorney, Agent, or Firm*—RatnerPrestia

(57) ABSTRACT

A digital broadcast receiving apparatus, which has a receiving circuit for receiving a transmitted high frequency signal of a plurality of time division multiplexed programs, includes a circuit for selecting a better receiving characteristic condition while a desired program is not received.

3 Claims, 6 Drawing Sheets

U.S. PATENT DOCUMENTS

2002/0159541 A1 10/2002 Tahtinen
2003/0119464 A1* 6/2003 Toyoda et al. ............ 455/245.1

FOREIGN PATENT DOCUMENTS

| JP | 61-39649 | 2/1986 |
| JP | 4-90220 | 3/1992 |
| JP | 09-148973 * | 6/1997 |
| JP | 9-321678 | 12/1997 |
| JP | 2001-7713 | 1/2001 |
| JP | 2001-168748 | 6/2001 |

* cited by examiner

DIGITAL BROADCAST RECEIVING APPARATUS

This Application is a U.S. National phase Application of PCT INTERNATIONAL APPLICATION PCT/JP2004/003393.

TECHNICAL FIELD

The invention relates to a digital broadcasting receiving apparatus for receiving a transmitted signal of a plurality of time division multiplexed programs, particularly, a digital broadcast receiving apparatus, which is effective when it is used for mobile terminals.

BACKGROUND ART

FIG. 5 is a block diagram of a conventional digital broadcast receiving apparatus in mobile terminals. FIGS. 6A and 6B illustrate a relation between a time division multiplexed program and power supply controlling timing in a conventional digital broadcast receiving apparatus.

A conventional digital broadcast receiving apparatus includes antenna portion 1602, receiving circuit 1142, power supplying circuit 1143 and demodulating portion 1141.

Antenna portion 1602 receives at antenna 1601 a radio wave in a space to convert the radio wave into an RF receiving circuit input signal at BPF (a bandpass filter) 1104.

Receiving circuit 1142 consists of channel-selecting portion 1109 and other portions. Channel-selecting portion 1109 includes VCO (voltage controlled oscillator) 1106, synthesizer 1107 and controlling voltage generating circuit 1108. Portions of receiving circuit 1142 other than channel-selecting portion 1109 include RF variable gain amplifier 1110, frequency converting circuits 1111 and 1113, 90° phase shift circuit 1112, low pass filters 1114 and 1115, frequency adjusting circuit 116 and base band variable gain amplifiers 1117 and 1118. Receiving circuit 1142 selects a desired channel signal from inputted signals and converts the selected signal into a base band signal.

Demodulating portion 141 demodulates the base band signal to output a transport stream (referred to as a TS, hereinafter).

Power supplying circuit portion 1143 supplies receiving circuit 1142 and demodulating portion 1141 with power.

FIG. 6A shows time division multiplexing of digital broadcast transmitted after time division multiplexing. In FIG. 6A, signals from Program 1 to Program 4 are time multiplexed.

Signal information recover circuit 126 of demodulating portion 1141 obtains program timing from Program 1 to Program 4 on the basis of the TS. In the case that Program 3 is desired, for example, a timing signal shown in FIG. 6B is outputted. Power supply on/off timing generating circuit 1134 uses the timing signal to generate a signal whose voltage level is capable of on/off control of power supplying circuit 1137 of receiving circuit 1142 other than channel-selecting portion 1109. As described above, turning off during an undesired program of the TS a supplying power source to receiving circuit 1142 other than channel-selecting portion 1109 in which it takes long time to become stable after turning on the power supply allows a low consumption power to be enabled and battery consumption to be restrained.

As information of former art references concerning to the invention, US Laid-Open Patent Application No. 2002-015941 A1 is known, for example.

The digital broadcast receiving apparatus to be used, which is built in a mobile terminal, is, however, used as a mobile, so that a receiving point is changed. Accordingly, a state of a radio wave changes as time passes, and therefore, a stable reception is impossible. Nevertheless, changing the state of digital broadcast receiving apparatus always in accordance with a state of the radio wave causes a problem that it takes long time until the circuit becomes steady, and thereby, an image or a sound would be interrupted.

Furthermore, a digital broadcast receiving apparatus described in JP-A-2001-7713 is disclosed as follows.

A signal level of each analog broadcast channel is stored in advance as channel information in a channel information memory portion. In channel-selecting of a desired channel, an analog broadcast wave signal of a channel close to the desired channel is acquired from the memory portion. An operation starting point is set high to increase strength against a interference wave in the case that the interference wave is at a high level while the operation starting point is set low to cover a dynamic range in the case of no interference wave.

This enables, regardless of existence of a high interference wave having a high signal level in a close channel, the digital broadcast in a desired channel to be stably received while a low noise characteristic is kept.

The digital broadcast receiving apparatus to be used, which is built in a mobile terminal, is, however, also used as a mobile, so that a receiving point is changed as time passes. Therefore, the operation starting point should be also switched as time passes since a level of the interference wave also varies. This causes a problem that a signal is interrupted in switching the operation starting point.

DISCLOSURE OF THE INVENTION

An object of the invention is to provide a digital broadcast receiving apparatus capable of stable receiving without interruption of an image or a sound even in the case of use as a mobile.

A digital broadcast receiving apparatus according to the invention includes a receiving circuit for receiving a transmitted high frequency signal of a plurality of time division multiplexed programs and a circuit for selecting a condition of a better receiving characteristic during a period in which a desired program is not received.

DETAILED DESCRIPTION OF THE PREFERRED EMBODIMENTS

An embodiment of the invention will be described below, made reference to the drawings.

Figure 1:
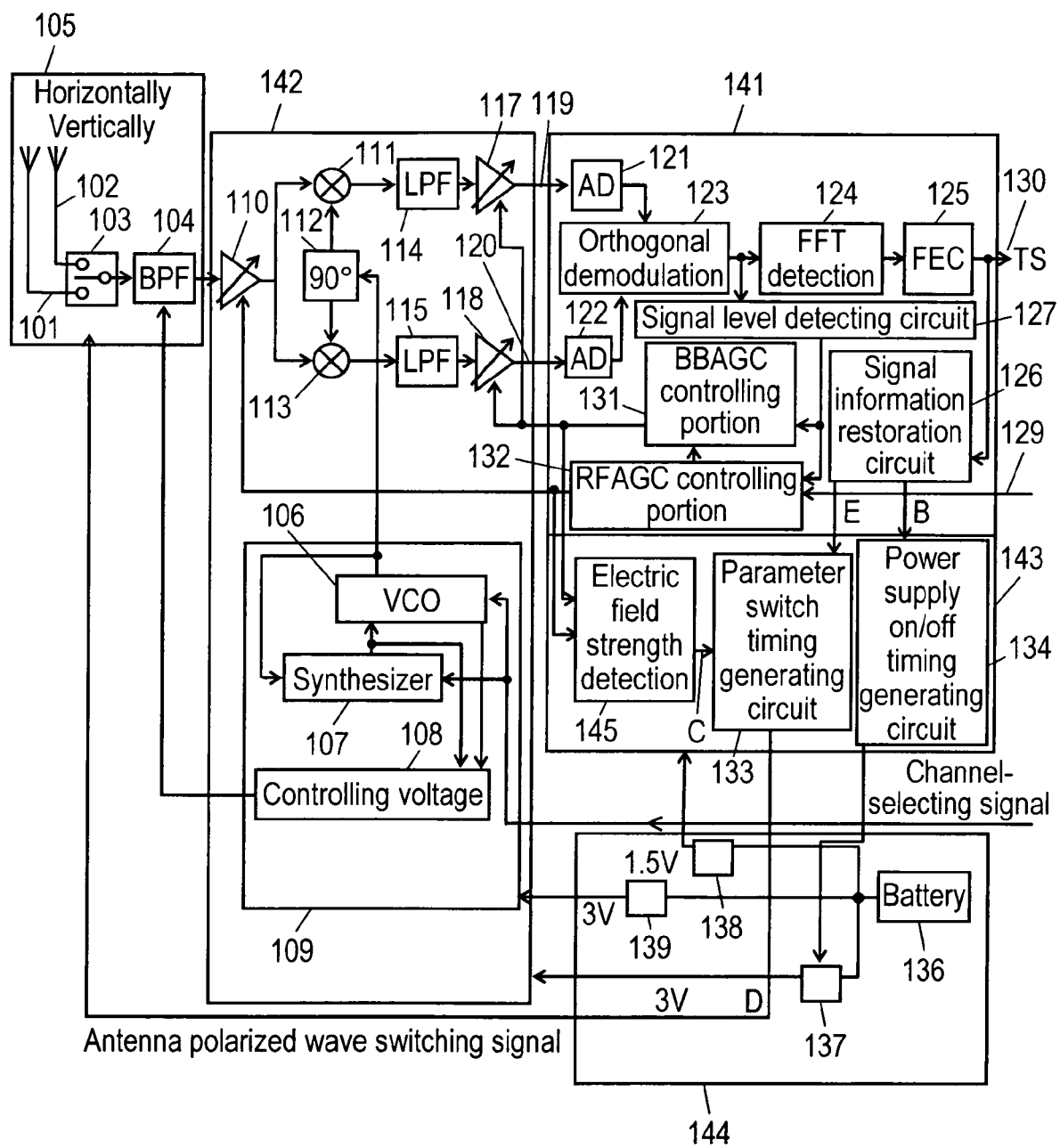
FIG. 1 is a block diagram of a digital broadcast receiving apparatus according to Embodiment 1 of the invention.

FIG. 1 is a block diagram of a digital broadcast receiving apparatus according to an embodiment of the invention.

Figure 2A:
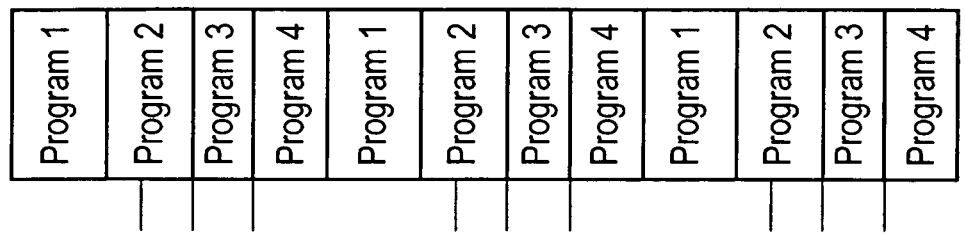
FIGS. 2A to 2E illustrate timing of an integral signal of a digital broadcast receiving apparatus according to Embodiment 1 of the invention.
Figure 2B:
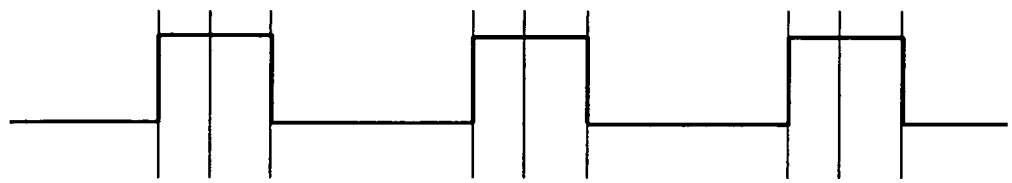
Figure 2E:
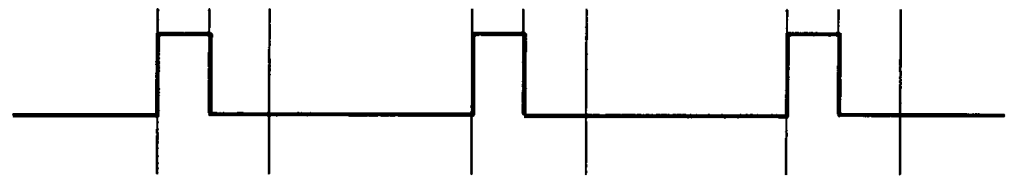
Figure 2C:
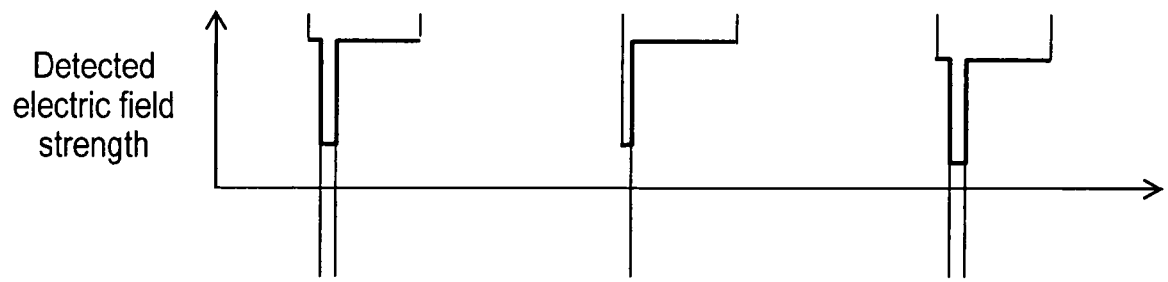
Figure 2D:
Figure 3:
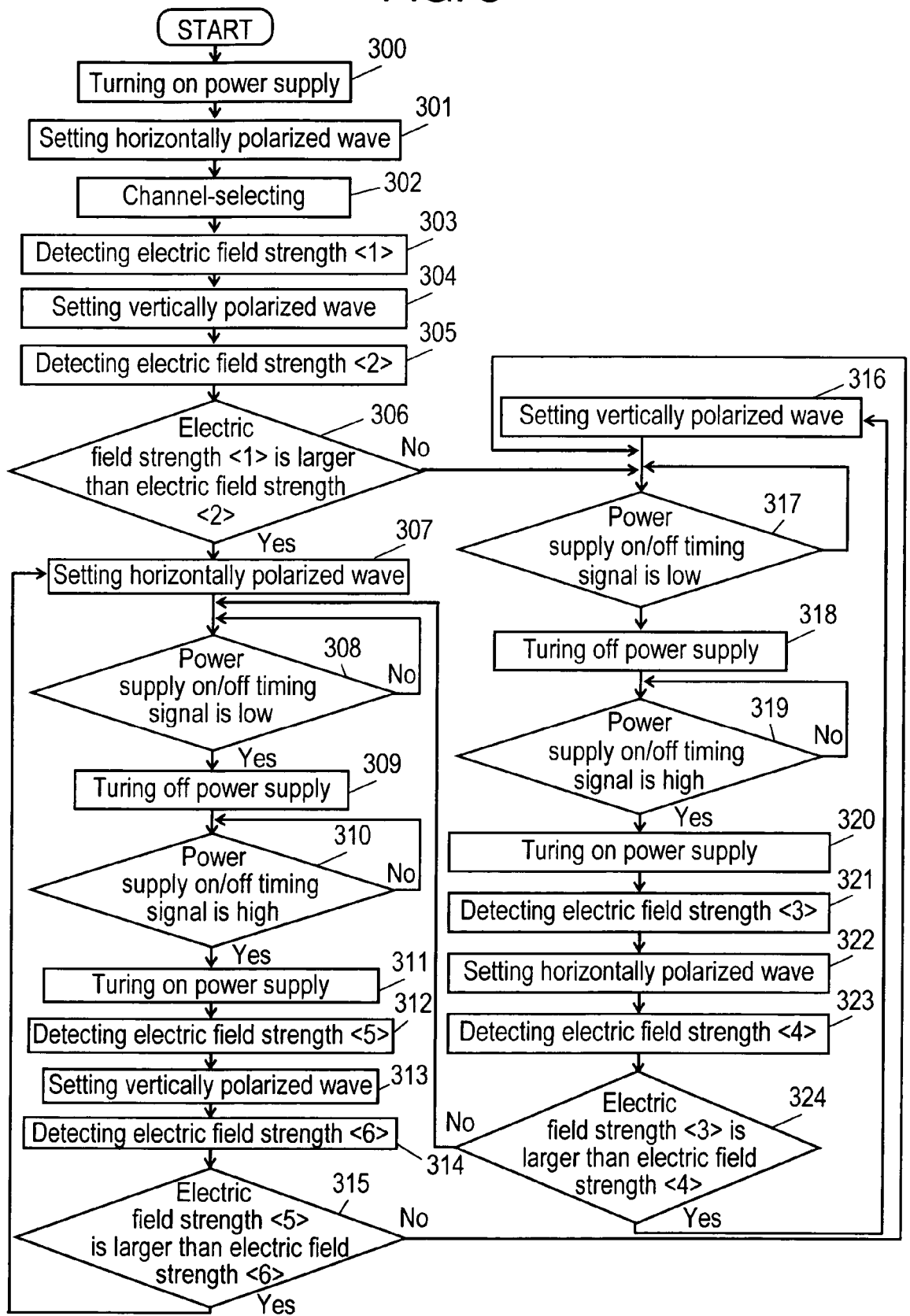
FIG. 3 is a flowchart illustrating a digital broadcast receiving apparatus according to Embodiment 1 of the invention.

FIGS. 2A to 2D illustrate timing of an integral part signal of the digital broadcast receiving apparatus. FIG. 3 is a flowchart illustrating an operation of the digital broadcast receiving apparatus.

In FIG. 1, a transmitted high frequency signal of a plurality of time division multiplexed programs is inputted to antenna potion 105. Antenna portion 105 includes horizontally polarized wave antenna 101, vertically polarized wave antenna 102, antenna switching circuit 103 and bandpass filter 104 capable of varying a passband (referred to as BPF, hereinafter).

Station-selecting portion 109 includes voltage controlled oscillator 106 (referred to as VCO, hereinafter), synthesizer 107 and controlling voltage generating circuit 108 for controlling a passband of BPF 104 in accordance with a received channel.

Receiving circuit 142 includes RF variable gain amplifier 110, frequency converting circuits 111 and 113, phase shift circuit 112, low pass filters (referred to as LPF, hereinafter) 114 and 115, base band variable gain amplifiers 117 and 118 and channel-selecting portion 109.

RF variable gain amplifier 110 controls amplitude of an outputted signal from BPF 104. An outputted signal from VCO 106 is inputted to phase shift circuit 112, which supplies frequency converting circuits 111 and 113 with a signal having phase difference of 90 degrees. Frequency converting circuit 111 converts an output from RF variable gain amplifier 110 into a baseband I signal. Frequency converting circuit 113 converts an output from amplification circuit 110 into a base band Q signal. LPFs 114 and 115 limit bandwidth of outputted signals from frequency converting circuits 111 and 113, respectively. Each of base band variable gain amplifiers 117 and 118 controls amplitude of output signals from LPFs 114 and 115, respectively.

Power supply portion 144 includes battery 136 and power supplying circuits 137, 138 and 139 for converting a voltage of battery 136 into a predetermined voltage. Power supplying circuit 137 supplies receiving circuit 142 other than channel-selecting portion 109 with a voltage. Power supplying circuit 138 generates a voltage to be supplied to demodulating portion 141. Power supplying circuit 139 generates a voltage to be supplied to channel-selecting portion 109.

In demodulating portion 141, outputs from base band variable gain amplifiers 117 and 118 are converted into digital signals respectively by means of AD converters 121 and 122. Outputs from AD converters 121 and 122 are orthogonally demodulated by means of orthogonally demodulating circuit 123 and are FFT-detected by means of FFT detecting circuit 124. An output from FFT detecting circuit 124 undergoes an error correcting process in error correcting circuit 125 (referred to as FEC, hereinafter) to output TS signal 130. Signal information recover circuit 126 outputs a signal shown in FIG. 2B on the basis of TS signal 130 to control power supplying circuit 137 through power supply on/off timing generating circuit 134. That is to say, timing generating circuit 134 turns on and off a power supply of a part of receiving circuit 142 other than channel-selecting portion 109. Signal information recover circuit 126 outputs a signal shown in FIG. 2E to parameter switch timing generating circuit 133.

Level detecting circuit 127 compares output amplitude of orthogonally demodulating circuit 123 with reference value amplitude to output a signal to RFAGC controlling portion 132 and BBAGC controlling portion 131 in accordance with a result of the comparison. RFAGC controlling portion 132 controls a gain of RF variable gain amplifier 110 while BBAGC controlling portion 131 controls a gain of base band variable gain amplifiers 117 and 118, on the basis of an output from level detecting circuit 127 so that an input signal level of AD converters 121 and 122 would be constant.

Operation starting point controlling signal 129 controls RFAGC controlling portion 132 directly and BBAGC controlling portion 131 through RFAGC controlling portion 132. That is to say, operation starting point controlling signal 129 can control operation starting points of RF variable amplifier 110 and base band variable gain amplifiers 117 and 118.

In such gain adjustment for making an input level of AD converters 121 and 122 constant, a rate between a gain of RF variable gain amplifier 110 and a gain control amount of base band variable gain amplifiers 117 and 118 can be changed as follows.

Operation starting controlling signal 129 can change an operation starting point of RF variable gain amplifier 110 by adding a DC offset to an output signal of RFAGC controlling portion 132. Setting an operation point so as to start operation from weak power, for example, allows a gain of RF variable gain amplifier 110 to be small. Operation starting point controlling signal 129 thus adds a DC offset enlarging a gain of base band variable gain amplifiers 117 and 118 in BBAGC controlling portion 131. As a result, a rate of a gain control amount can be changed while input levels of AD converters 121 and 122 are kept to be constant. Similarly, in the case of setting an operation point so as to start operation from strong power, a gain of RF variable gain amplifier 110 can be made large. Operation starting point controlling signal 129 thus adds a DC offset, which makes a gain of base band variable gain amplifiers 117 and 118 small in BBAGC controlling portion 131. As a result, a rate of a gain controlling amount can be changed while input levels of AD converters 121 and 122 art kept to be constant.

Parameter switch timing generating circuit 133 switches between horizontally polarized wave antenna 101 and vertically polarized wave antenna 102 through antenna switching circuit 103 on the basis of signal C from electric field strength detecting circuit 145 and signal E from signal information recover circuit 126.

As shown in FIGS. 2A to 2D, signal A transmitted to antennas 101 and 102 is obtained by time division multiplexing four programs (Program 1 to Program 4), for example. Power supply on/off timing generating circuit 134 controls on and off of power supplying circuit 137 on the basis of controlling signal B shown in FIG. 2B. That is to say, power supplying circuit 137 is turned on when signal B is at a high level and a voltage is supplied to receiving circuit 142 other than channel-selecting portion 109. When a desired program is Program 3, for example, controlling signal B reaches a high level in Program 2, which has been multiplexed just before Program 3, and reaches a low level in the timing at which Program 3 is completed.

Lowering of consumption power of a digital broadcast receiving apparatus is performed as described above. The electric field strength detecting circuit detects electric field strength on the basis of outputs from BBAGC controlling portion 131 and the RFAGC controlling portion, namely, a signal for controlling gains of amplification circuit 110 and amplification circuits 117 and 118. Electric field strength detecting circuit 145 outputs output signal C shown in FIG. 2C. That is to say, signal C indicates input electric field strength to receiving circuit 142. Signal E shown in FIG. 2E is outputted from signal information recover circuit 126 and inputted to parameter switch timing generating circuit 133. Signal E is at a high level when signal B is at a high level and during a period in which signal A is in Program 2.

Switch of the antennas is allowed during a period in which signal E is at a high level. Signal D shown in FIG. 2D is an output from parameter switch timing generating circuit 133. Switching circuit 103 selects horizontally polarized wave antenna 101 when signal D is at a low level and vertically polarized wave antenna 102 when signal D is at a high level.

Next, operations of parameter switch timing generating circuit 133 and electric field strength detecting circuit 145 will be described. Electric field strength detecting circuit 145 operates while signal B is at a high level and detects the electric field strength of an electric wave received at antenna portion 105. Timing generating circuit 133 first obtains electric field strength EFI-1, which is detected by detecting circuit 145, while signal E is at a high level. After obtaining EFI-1, timing generating circuit 133 inverts its output signal level so as to switch an antenna currently selected by switching circuit 103 (antenna 101, for example) to another antenna (antenna 102, for example). Timing generating circuit 133 obtains electric field strength EFI-2 from detecting circuit 145 after switching circuit 103 selects the other antenna (antenna 102). In the case that EFI-2 is smaller than EFI-1, timing generating circuit 133 inverts its output signal level again so as to select an original antenna (antenna 101), which had been selected before switching. On the other hand, timing generating circuit 133 maintains its output signal level when EFI-2 is larger than EFI-1.

Control of power supplying circuit 137 and switch between horizontally polarized wave antenna 101 and vertically polarized wave antenna 102 by means of antenna switching circuit 103 will be described, made reference to a flowchart shown in FIG. 3.

First, a power supply for whole receiving circuit 142 is turned on at Step 300. Horizontally polarized wave antenna 101 is then selected at Step 301 to select a desired channel in Step 302. That is to say, channel-selecting signal S is used for setting an output frequency from channel-selecting portion 109 (frequency of VCO 106) and passing frequency of BPF 104.

Then, electric field strength <1> is detected by electric field strength detecting circuit 145 at Step 303 and an antenna is switched to vertically polarized wave antenna 102 at Step 304 following to Step 303. At Step 305, electric field strength <2> is detected. When it is found at Step 306 that electric field strength <1> is larger than electric field strength <2>, horizontally polarized wave antenna 101 is set at Step 307.

When an output signal from power supply on/off timing generating circuit 134, namely, output signal B of a signal information recover circuit reaches a low level at Step 308 after Step 307, power supplying circuit 137 is turned off at Step 309.

Then, after signal B reaches a high level at Step 310, power supplying circuit 137 is turned on at Step 311 to detect electric field strength <5>.

At Step 313, an antenna is switched to vertically polarized wave antenna 102 and electric field strength <6> is measured at Step 314. When it is found that electric field strength <5> is larger than electric field strength <6> at Step 315, the routine returns to Step 307.

When it is found that electric field strength <5> is smaller than electric field strength <6> at Step 315, the routine goes to Step 317. In the case that signal B reaches a low level at Step 317, power supplying circuit 137 is turned off at Step 318. Then, when signal B reaches a high level at Step 319, power supplying circuit 137 is turned on at Step 320. After electric field strength <3> is measured at step 321, horizontally polarized wave antenna 101 is selected at Step 322. At Step 323, electric field strength <4> is measured. When it is found in Step 324 that electric field strength <3> is larger than electric field strength <4>, vertically polarized wave antenna 102 is selected at Step 316 and the routine goes to Step 317. In the case that it is found in Step 324 that electric field strength <3> is smaller than electric field strength <4>, the routine goes to Step 308. When it is found in Step 306 that electric field strength <1> is smaller than electric field strength <2>, the routine goes to Step 317.

As described above, switching is performed between horizontally polarized wave antenna 101 and vertically polarized wave antenna 102 during an undesired receiving program to select a state in which an electric field inputted to receiving circuit 142 is strong, that is, a state having a receiving characteristic. Accordingly, a desired receiving program can be received with high performance, and furthermore, a signal is not interrupted since switching is not carried out in receiving a desired program.

Figure 4:
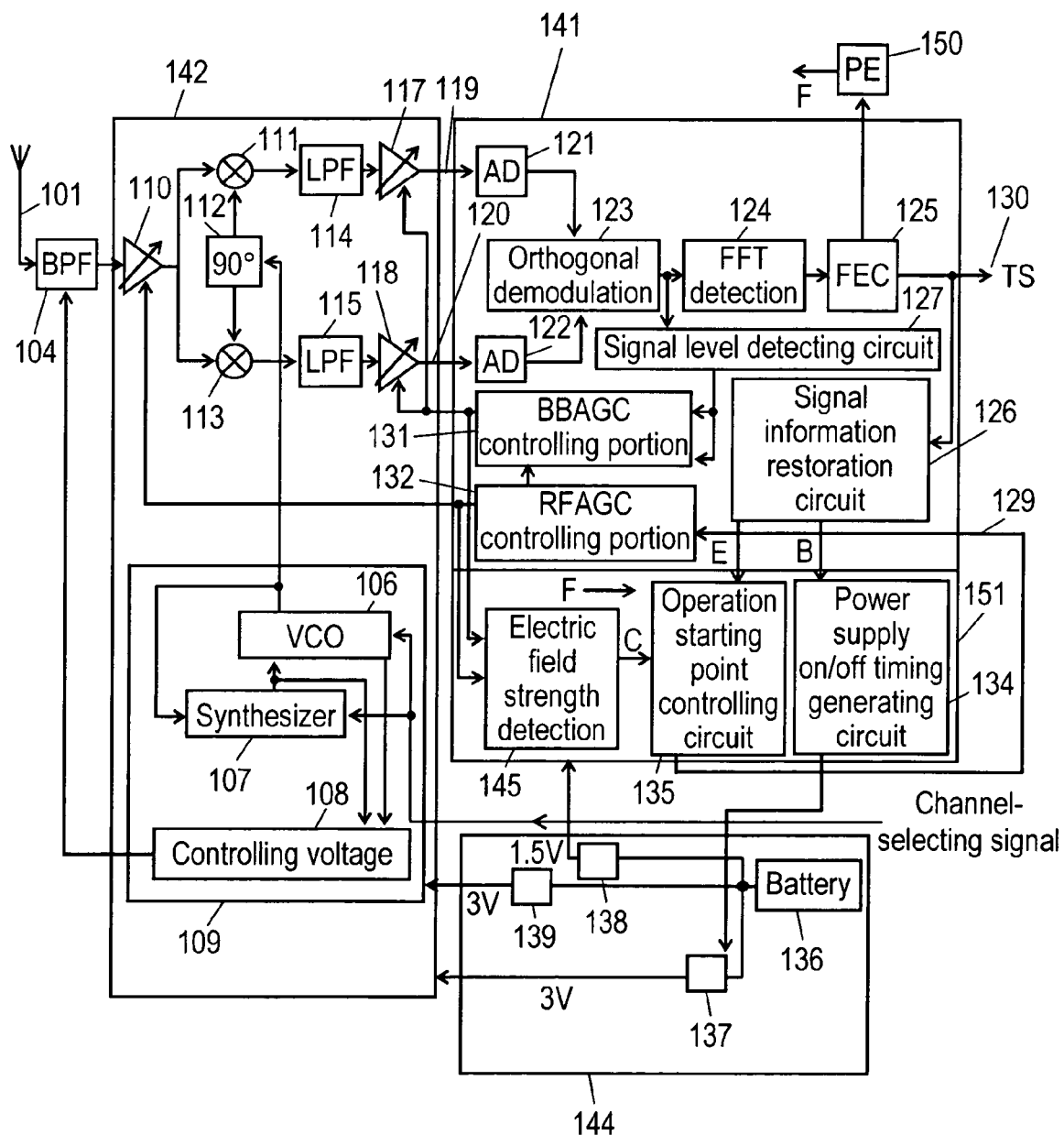
FIG. 4 is a block diagram of another digital broadcast receiving apparatus according to Embodiment 1 of the invention.
Figure 5:
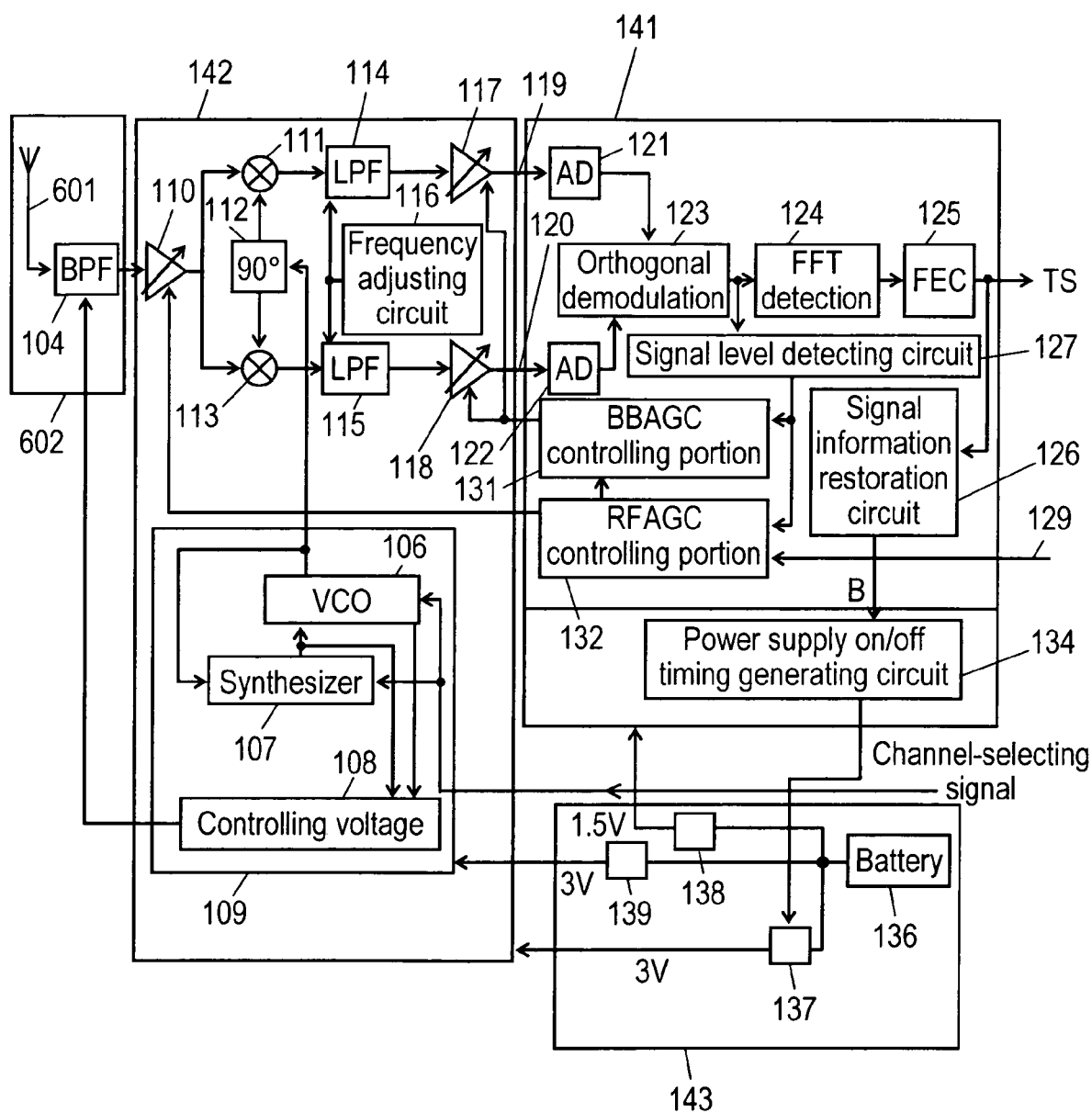
FIG. 5 is a block diagram of a conventional digital broadcast receiving apparatus.
Figure 6A:
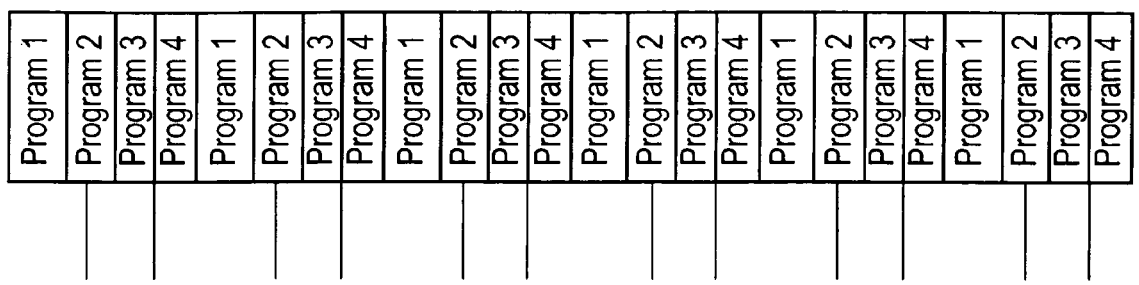
FIGS. 6A and 6B illustrate an operation of a conventional digital broadcast receiving apparatus.
Figure 6B:
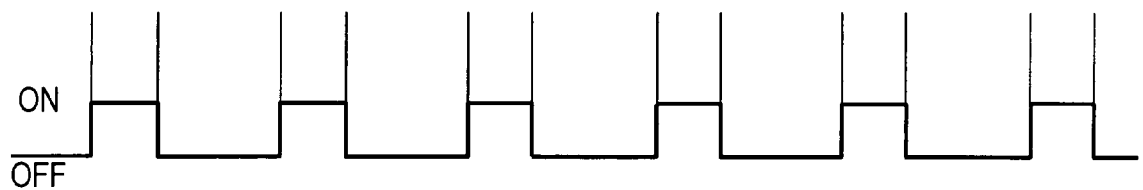

FIG. 4 is a block diagram in which an antenna switching function is eliminated from and error ratio measuring circuit 150 is added to a digital broadcast receiving apparatus according to an embodiment of the invention shown in FIG. 1. In FIG. 4, a component having the same function to that of FIG. 1 is marked with the same reference number. In FIG. 4, an antenna switching function, namely, vertically polarized wave antenna 102, a switching circuit 103 and parameter switch timing generating circuit 133 may be provided, similarly to FIG. 1.

Error ratio measuring circuit 150 measures a packet error ratio to output signal F indicating whether or not the measured value is larger than a predetermined value. While an undesired program is received and power supply of receiving circuit 142 is on (while signal E shown in FIG. 2E is at a high level), carried are following operations. In the case that signal F indicates a packet error ratio worse than the predetermined value even when output C of electric field strength detecting circuit 145 indicates electric field strength large enough, it is judged that a high interference wave exists in the vicinity. Operation starting point controlling circuit 135 then adds a DC offset to an output signal of RFAGC controlling portion 132 in order to increase strength against a interference wave so that an operation point would be set to start operation from weak power. As a result, a gain of RF variable gain amplifier 110 becomes small, so that an input level of frequency converting circuits 111 and 113 are decreased. Accordingly, a level of distortion is lowered and this allows an error ratio to be improved.

Operation starting point controlling circuit 135 changes an operation starting point in accordance with signals F and C, with reference to timing of signal E, so that the operation starting point is not changed in receiving a desired program, and therefore, a signal is not interrupted.

In the embodiment of the invention, existence of an analog broadcast wave signal of a channel close to a desired channel is judged on the basis of the error ratio and the electric field strength of the desired channel. Directly measuring a signal level of an analog broadcast wave signal of a close channel, however, allows a similar result to be obtained. Further, an adjacent signal is analog broadcast wave signal in the embodiment, but a similar effect can be obtained even in the case of a digital broadcast wave signal or other undesired signals.

In the description from FIG. 2A to FIG. 2D, comparison of receiving conditions is carried out every cycle during an undesired signal with a parameter (an antenna characteristic or an operation point of a variable gain adjusting circuit) changed. In the case that the change of the receiving condition is considered not to be fast, however, a similar result can be obtained even when the comparison of receiving conditions is carried out once per several cycles or even when the comparison is performed during an undesired signal with a parameter changed only in the case that degradation of receiving performance reaches a predetermined value in receiving a desired signal so as to select the condition with the better receiving performance.

INDUSTRIAL APPLICABILITY

As described above, in accordance with the invention, a parameter such as an antenna characteristic or an operation staring point of a variable gain controlling circuit is switched during an undesired receiving program to select an optimum parameter, so that a desired receiving program can be received with high performance and a signal is not interrupted since the switch is not performed in receiving a desired program. Furthermore, a power supply of an unnecessary circuit can be turned off while a circuit of an undesired program is not in use. This allows a low consumption power effect to be maintained.

The invention claimed is:

1. A digital broadcasting receiving apparatus, having a receiving circuit for receiving a transmitted high frequency selected program signal of a plurality of time division multiplexed programs, comprising:
   an electric field strength detector for detecting the strength of an electric field;
   an error ratio measuring circuit for measuring errors in received data packets;
   a radio frequency variable gain circuit having a radio frequency operation starting point, the radio frequency operation starting point determining a radio frequency power level of the radio frequency variable gain circuit;
   a baseband variable gain circuit having a baseband operation starting point, the baseband operation starting point determining a baseband power level of the baseband variable gain circuit;
   an operation starting point controlling circuit that varies:
   a) the radio frequency operation starting point to start operation from a low radio frequency power level which is lower than a high radio frequency power level used when detecting the electric field strength and measuring the errors, and
   b) the baseband operation starting point to start operation from a high baseband power level which is higher than a low baseband power level used when detecting the electric field strength and measuring the errors,
   wherein while receiving the plurality of time division multiplexed programs other than the selected program, the radio frequency operation starting point and the baseband operation starting point are varied in accordance with a) and b) in response to the detected electrical field strength being above a predetermined electric field threshold and the measured errors in the received data packets being above a predetermined error threshold.

2. The digital broadcasting receiving apparatus according to claim 1, wherein a parameter switch timing generating circuit controls a switch in response to the detected electrical field strength, wherein the switch switches between a vertically polarized antenna and a horizontally polarized antenna.

3. The digital broadcasting receiving apparatus according to claim 1, including an analog to digital converter, an output signal of the baseband variable gain circuit is an input signal to the analog to digital converter,
   wherein the radio frequency operation starting point and the baseband operation starting point are varied to ensure that the input signal to the analog to digital converter maintains a constant level.

\* \* \* \* \*